United States Patent [19]
Walker

[11] 3,738,217
[45] June 12, 1973

[54] INSULATION HANGER

[75] Inventor: Myles C. Walker, Medford Lake, N.J.

[73] Assignee: Omark Industries, Inc., Portland, Oreg.

[22] Filed: Oct. 8, 1970

[21] Appl. No.: 79,054

[52] U.S. Cl. .................................. 85/8.6, 52/506
[51] Int. Cl. ........................................... F16b 21/16
[58] Field of Search .................. 85/7, 21, 28, 1 L, 85/8.6; 52/582, 511, 506

[56] References Cited
UNITED STATES PATENTS

| | | | |
|---|---|---|---|
| 1,052,179 | 2/1913 | Robley | 85/1 L |
| 2,122,276 | 6/1938 | Bosco | 85/1 L |
| 2,323,260 | 6/1943 | Venditty | 85/1 L |
| 2,697,857 | 12/1954 | Eckel | 85/7 |
| 2,372,566 | 3/1945 | Gazley | 85/32 V |
| 1,523,463 | 1/1925 | Thomson | 85/1 L |
| 3,395,602 | 8/1968 | Strange | 85/32 V |
| 486,217 | 11/1892 | Peterson | 85/7 |
| 2,412,744 | 12/1946 | Nelson | 85/28 |
| 3,523,395 | 8/1970 | Rutter et al. | 52/506 |

FOREIGN PATENTS OR APPLICATIONS
651,985  11/1962  Canada .................................. 85/7

*Primary Examiner*—Edward C. Allen
*Attorney*—Charles F. Duffield

[57] ABSTRACT

A hanger assembly for securing refractory linings to furnace walls which includes an elongate rectangular stud welded at one end to a supporting wall and the opposite end extending substantially perpendicular from the wall and including therein a plurality of opposed notches cut into the opposed narrower sides. A relatively thin retaining clip formed of sheet material is provided and includes an aperture therein of complementary configuration to the rectangular stud. The clip is inserted over the stud and against the refractory lining and rotated 90° into locked position. In one species, the dimension of the opposed notches provides an interference fit with the clip as it is rotated and in a second species the opposed walls of the notches taper outwardly to permit unrestrained rotation of the clip at the narrow point of the taper but restrain the clip from rotation at the wider point of the taper.

2 Claims, 4 Drawing Figures

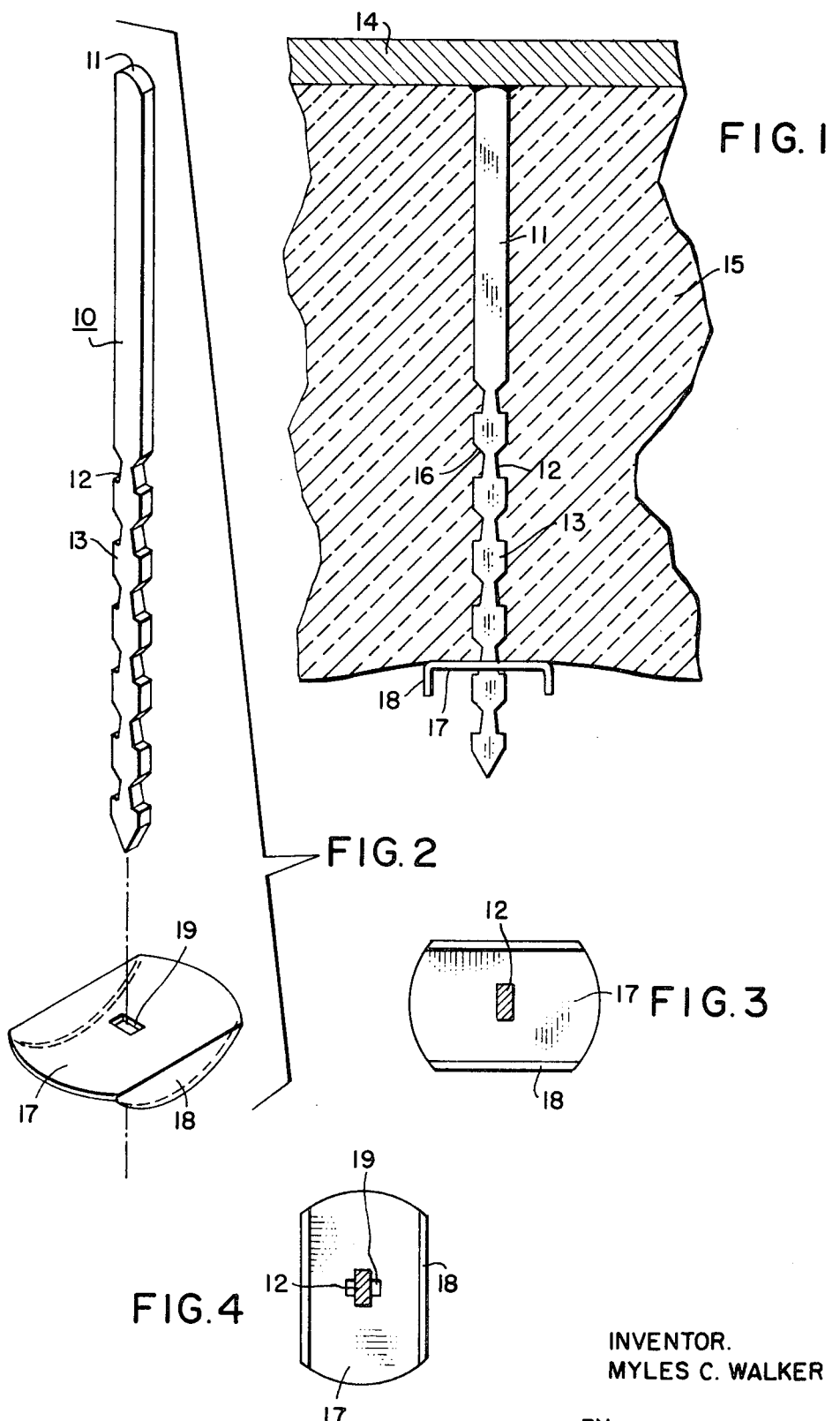

INSULATION HANGER

BACKGROUND OF INVENTION

The present application is concerned with anchor or hanger assemblies for supporting panel members to walls of structures and, more specifically, to hanger assemblies for supporting refractory panels and blankets to the walls of refractory furnaces.

The walls of refractory furnaces are lined with refractory blocks and blankets to protect the walls from the sever heat within the furnace. It is necessary to initially anchor the refractory block. Likewise, during use of the furnace, the walls will deteriorate and it is necessary to reline the furnace.

One of the more common methods of anchoring the wall lining is to weld a threaded stud to the refractory wall. Thereafter, the refractory lining is placed against the wall over the stud and a common washer and nut is used to secure the lining in place.

Another commonly used anchoring system is the anchor known as the pig-tail anchor. This anchor is an elongate welding stud in which one end thereof is bent over at an angle. In this arrangement, the refractory lining is put in place against the wall and the pig-tail anchor pushed through the lining into contact with the metal wall after which the anchor is welded to the wall by the stud welding technique. The bent over portion of the anchor will be against the outside surface of the lining and will retain the lining in place.

Both of the prior methods have various serious shortcomings. The threaded stud and nut arrangement is undesirable when replacement of the lining becomes necessary. Due to the sever heat conditions within the furnace, the nut and threads will have become so deteriorated that the nuts cannot be removed or new nuts rethreaded over the old studs. Accordingly, considerable labor and expense must be incurred in removing the old lining and rewelding the new studs to be used with new nuts and washers.

The pig-tail anchor arrangement likewise has the drawback of reusability. The anchors themselves must be destroyed to remove the old lining and consequently cannot be reused when assembling new lining. Additionally, the pig-tail anchor is welded after the lining is in place and it is impossible to see the quality of the weld that has been effected. Additionally, the pig-tail anchor cannot be readily adjusted to provide the proper compression against the lining and a plurality of different lengths of anchors must be selected and used to secure the lining.

OBJECTS AND SUMMARY OF INVENTION

Accordingly, it is an object of the present invention to provide a hanger assembly for supporting a refractory panel member which is capable of adjustment for varying sizes of lining material, which can be reused during relining and which can be welded in such a manner that the quality of the weld can be observed. In accordance with the present invention, an elongate end weldable stud is provided which can be welded in place before the lining is placed against the wall and thus the quality of the weld can be inspected. The stud is substantially rectangular in configuration having one pair of opposed sides narrower than the other side. The stud includes a plurality of opposed notches in the stud cut into the narrower sides of the stud. The refractory lining is inserted over the stud against the wall and the stud is of sufficient length to project from the lining when in place. A flat clip retaining formed from a relatively thin sheet material of thickness substantially less than the longitudinal length of the notches is provided. The clip includes a corresponding but slightly larger rectangular aperture in the clip and is inserted over the stud with the aperture concentric with the stud and turned into locking engagement with one of the sets of opposed notches as determined by the thickness of the lining being secured.

In one species, the distance between the corners of the opposed notches is greater than the minor rectangular dimension of the aperture of the clip in order that the clip will come into an interference fit with the stud when rotated 90° into locking position. In another species, the opposed walls of the notches are tapered outwardly from the longitudinal axis of the stud toward the unwelded edge of the stud and so dimensioned such that the clip may be freely rotated, when at the narrow point in the opposed notches, and held against rotation, when forced toward the larger tapered end of the opposed notches, by the refractory material when in place.

The clip includes up turned edges which facilitate in rotating of the clip onto an out of locking engagement with the studs.

The hanger assembly of the present invention may be universally employed for any different thickness of lining material inasmuch as the clip can be moved along the stud and locked against any of the plurality of opposed notches. Additionally, do to the simplicity of the locking arrangement, the clip can be quickly removed and the stud and clip reused for a new lining assembly.

Other objects and advantages of the present invention will become apparent from the detailed description thereof taken in conjunction with the drawing.

DESCRIPTION OF DRAWING

FIG. 1, is a partial sectional view of the hanger assembly of the present invention in assembled position;

FIG. 2, is an exploded isometric view of the hanger assembly of the present invention;

FIG. 3, is an end view of the hanger assembly before the clip is locked, and

FIG. 4, is an end view of the hanger assembly in locked position.

DETAILED DESCRIPTION OF INVENTION

The hanger assembly of the present invention, in assembled position, is shown in FIG. 1 of the drawing. The hanger assembly includes an end weldable stud 10, which is end welded at one end 11 by the well known stud end welding technique, to the wall of the structure to be lined, i.e., the metallic wall 14 of a furnace. After the stud is welded in place, a block or panel of lining material 15 is forced over the stud against the wall 14.

The lining material 15 may be a singular block or panel of refractory material or it may be a composite of block material and a blanket which covers the block material as is commonly used. In any event, the length of the stud 10 is dimensioned so that a portion of the stud will always extend from the thickest portion of the lining material that is expected to be encounter.

As shown in FIG. 2, the stud 10 is substantially rectangular in cross section and has one pair of opposed sides narrower than the other pair. A plurality of opposed notches 12 are disposed along the end of the stud opposite its welding end. The notches 12 are cut into the narrower sides of the stud.

The hanger assembly includes a substantially flat clip 17 formed of a relatively thin sheet material of thickness substantially less than the longitudinal length of the notches. The surface area of the clip 17 is designed such that it will have proper bearing on the lining material to support the material without breaking into the surface of the lining.

The clip 17 includes an aperture 19 therein which is of a configuration complimentary with but slightly larger than the unnotched portions 13 of the rectangular stud 10. The clip is designed to pass over the rectangular stud when the rectangular aperture 19 is concentrically aligned with the unnotched portions 13 of the stud.

During assembly, the clip 17 will be pushed downwardly over the stud 10 until the proper compression has been applied to the lining 15 as shown in FIG. 3. When this point has been reached, the clip 17 will then be rotated through 90° in the particular pair of opposed notches 12 that are available at the point at which the clip has been moved over the stud 10, as shown in FIG. 4.

The notches 12, in a particular species, are such that the opposed walls thereof taper outwardly from the longitudinal axis of the stud toward the unwelded end of the stud 10. The minimum distance between the opposed walls of the notches is less than the minor dimension of the rectangular aperture in the clip 17 and consequently less than the minor dimension of the rectangular stud 10. The opposite end of the taper in the notches is dimensioned so as to be in excess of the minor dimension of the rectangular aperture 19 in the clip. Additionally, the length of the notches is substantially in excess of the thickness of the clip 17. By this arrangement, the clip 17 may be moved along the stud 10 to the desired notch and held in the vicinity of the minimum dimension of the notch and freely rotated to the locking position. Once the clip has been rotated into locked position, it is then released and the resilient force of the lining 15 will push the clip 17 toward the larger dimension of the taper thus bringing the walls of the notch into contact with the sides of the aperture 19. In this manner, the clip 17 is secured against unintentional rotation into the unlocked position.

The shoulders 16 of the notches are beveled in the area of the minimum dimension. The bevel provides a smooth shoulder around which the clip 17 may be rotated without interference. Were the bevel not to be present, the sharp corners of the notches would, in some cases, interfere with the starting of rotation of the clip.

The clip 17 may be secured against unintentional rotation to the unlocked position by means other than the tapered notches. In another species, the opposed walls of the notches are maintained parallel and the diagonal dimension between the corners of the notches made in excess of the minor dimension of the rectangular aperture 19. In this manner, when the clip 17 is rotated in the notch 12, the corners of the notch will pass into interference with the sides of the aperture 17. As the clip is rotated further into the 90° position, it will pass out of interference and snap into place.

The clip 17 includes downturned edges 18 thereon. These edges 18 facilitate in the rotation of the clip when it is being locked into position.

The clip may be either metallic or ceramic. Ceramic clips will withstand sever heat conditions better than the metallic clips, and can be easily removed by fracturing.

The hanger assembly of the present invention has been described in respect to its use for securing refractory linings to the walls of furnaces and the like. However, it is anticipated that the hanger assembly may have many other uses in environments other than refractory furnaces. Additionally, while the invention has been described in respect to particular embodiments thereof as shown in the drawing, no limitation is thereby intended, but instead, the scope of the invention is to be interpreted in view of the appended claims.

I claim:

1. A hanger assembly for supporting a panel-like member comprising:

An elongate end weldable stud of rectangular cross section having one pair of opposed sides narrower than the other pair and adapted to be welded, at one end, by the stud and welding technique to a metallic supporting member associated with the surface on which the panel is to be assembled;

A retaining clip formed of a relative thin sheet material (having a substantially flat surface) and including therein an aperture of configuration corresponding to and slightly larger than the cross section of the stud; and, A plurality of opposed notches of longitudinal length in excess of the thickness of the sheet material (positioned along) cut into the narrower sides of the stud, the opposed walls of said notches tapering outwardly from the longitudinal axis of the stud in the direction of the unwelded end of the stud and wherein the distance between the opposed walls (sides) of the notches ranges from a minimum of less than the (minor) narrow dimension of the (stud) aperture to a maximum in excess of the (minor) narrow dimension of the (stud) aperture whereby the clip can be freely rotated into locked position at the point of minimum dimension between the notches and restricted against rotation from locked position when moved into the position of maximum dimension between the notches by the force of the panel being supported.

2. The hanger assembly of claim 1 wherein the edge of each notch adjacent the point of minimum dimension is beveled to permit the retaining clip to be rotated freely into position.

* * * * *